(12) United States Patent
Chin et al.

(10) Patent No.: US 7,837,240 B2
(45) Date of Patent: Nov. 23, 2010

(54) DISPLAY AND ITS LOCKING MECHANISM

(75) Inventors: Chung-Hsien Chin, Taipei (TW);
Cho-Keng Wu, Taipei County (TW)

(73) Assignee: BenQ Corporation, Taipei (TW)

(*) Notice: Subject to any disclaimer, the term of this patent is extended or adjusted under 35 U.S.C. 154(b) by 575 days.

(21) Appl. No.: 11/838,894

(22) Filed: Aug. 15, 2007

(65) Prior Publication Data

US 2008/0251658 A1  Oct. 16, 2008

(30) Foreign Application Priority Data

Apr. 13, 2007  (TW) .............................. 96113072 A

(51) Int. Cl.
*E05C 9/10*  (2006.01)
(52) U.S. Cl. ...................... 292/37; 248/176.1; 248/917; 248/222.13; 292/98
(58) Field of Classification Search ................ 248/681, 248/27.3, 222.13, 176.1, 917; 403/322.1, 403/322.3, 323, 231; 292/27, 37, 95, 98, 292/159, 140, 347; 70/108, 109, 110, 111
See application file for complete search history.

(56) References Cited

U.S. PATENT DOCUMENTS

| 7,025,321 | B2 * | 4/2006 | Jung ........................... 248/680 |
| 7,077,372 | B2 * | 7/2006 | Moran .................... 248/222.11 |
| 7,274,555 | B2 * | 9/2007 | Kim et al. .............. 361/679.27 |
| 2005/0236533 | A1 * | 10/2005 | McRight et al. ............. 248/161 |

* cited by examiner

*Primary Examiner*—J. Allen Shriver, II
*Assistant Examiner*—Bradley H Duckworth

(57) ABSTRACT

A display includes a main frame, a support base, and a locking mechanism. The support base including a first locking member is selectively connected to the main frame. The locking mechanism selectively connected to the first locking member of the support base includes a base, a plate, a pivot, and a second locking member. The base with a hole is movably disposed on the main frame. The plate is connected to the base, and is neighboring the hole. The pivot including a raised edge is disposed on the main frame, through the hole, and is near the plate. The second locking member is connected to the base for selectively engaging with the first locking member. When the raised edge abuts against the plate, the base is moved towards the first direction, and the second locking member is detached from the first locking member.

14 Claims, 4 Drawing Sheets

DISPLAY AND ITS LOCKING MECHANISM

BACKGROUND OF THE INVENTION

1. Field of the Invention

The present invention relates to a display, and more particularly, to a display having a locking mechanism.

2. Description of the Prior Art

FIG. 1 is a diagram of a display 1 in the prior art. The display 1 is supposed to have a rear housing for covering the inner structure of the display 1, and merely part of a support base 20 for connecting to a main frame 30 and a button 48, which is illustrated in FIG. 2, of a press switch 40 are exposed through the rear housing. For revealing the prior art, the rear housing of the display 1 is omitted in FIG. 1 and hereafter. As shown in FIG. 1, the display 1 includes the main frame 30, which is utilized for mounting the display 1, and the support base 20. The support base 20 is connected to the main frame 30 in a detachable manner. The press switch 40 is further disposed on the main frame for fastening the support base 20. The press switch 40 is fastened on the main frame 30 with fastening elements such as screws. In FIG. 1, the press switch 40 has not been fastened on the support base 20 for showing two first locking members 22 of the support base 20. In the prior art shown in FIG. 1, both the first locking members 22 are implemented with female components, i.e., the fillister surrounded by a dotted line in FIG. 1, where another first locking member 22 is invisible since the invisible first locking member 22 is covered by the support base 20 in FIG. 1.

While transporting the display 1, the support base 20 may be detached from the main frame 30 for reducing the volume of the display 1 during transportation, and it is beneficial in packaging and transportation. With the aid of both the first locking member 22 engaging with both second locking members 24 of the press switch 40, the support base 20 is fastened on the main frame 30. Both the second locking members 24 are implemented with male components, i.e., both the raised parts shown in FIG. 1. A detailed diagram of the press switch 40 is illustrated in FIG. 2.

Please refer to FIG. 2, which is an expanded diagram of the press switch 40 shown in FIG. 1. The press switch 40 includes a base 41, two clasps 42, a spring 43, and the button 48. Two fasteners 45 are engaged at tails of both the clasps 42, and are fastened on the main frame 30 with screws so that the base 41 may be disposed on the main frame 30 in a movable manner along the direction A shown in FIG. 2. The base 41 has a hole 47 and a ramp 44. A pillar 55 is inserted through the hole 47 for fastening the base 41, and is provided for the spring 43 to be put around. The button 48 touches the spring 43. A ramp 46 of the button 48 touches the ramp 44 of the base 41. When the button 48 is pushed, the ramp 46 of the button 48 also pushes the ramp 44 of the base 41 in order to move the base 41 along the direction A. At this time, both the clasps 42 are detached from both the first locking members 22, as shown in FIG. 1, for detaching the support base 20 from the main frame 30. When both the clasps 42 are detached from both the first locking members 22, the button 48 is pushed back by the elastic force of the spring 43, which is restored back to a stretching state at this time, and the base 41 is moved back as well.

As can be observed from FIG. 2, the press switch 40 has lots of parts. The display 1 is required to provide larger room for fitting the spring 43 under the stretching state. Such a large design makes it difficult to build light and thin electronic products, and is required to be improved.

SUMMARY OF THE INVENTION

The claimed invention provides a locking mechanism for selectively connecting a first locking member. The locking mechanism comprises a base, a plate, a pivot, and a second locking member. The base is capable of moving towards a first direction, and has a hole. The plate is connected to the base, and is neighboring the hole. The pivot is inserted through the hole and neighboring the plate. The pivot has a raised edge. The second locking member is connected to the base and for selectively engaging the first locking member. When the raised edge abuts against the plate, the plate is moved towards the first direction, and the second locking member is detached from the first locking member.

The claimed invention provides a display. The display comprises a mainframe, a support base, and a locking mechanism. The support base is selectively connected to the main frame. The support base has a first locking member. The locking mechanism is disposed on the main frame for selectively connecting to the first locking member of the support base. The locking mechanism comprises a base, a plate, a pivot, and a second locking member. The base is disposed on the main frame. The base is movable towards a first direction. The base has a hole. The plate is connected to the base and located near the hole. The pivot is disposed on the main frame. The pivot is inserted through the hole and near the plate. The pivot has a raised edge. The second locking member is connected to the base for selectively engaging with the first locking member of the support base. When the raised edge abuts against the plate, the base is moved along the first direction, and the second locking member is detached from the first locking member.

These and other objectives of the present invention will no doubt become obvious to those of ordinary skill in the art after reading the following detailed description of the preferred embodiment that is illustrated in the various figures and drawings.

DETAILED DESCRIPTION

For solving the defect that larger room from the display in the prior art is required to be provided for containing the press switch, a locking mechanism is provided in the present invention and applied on the display for replacing the press switch.

Figure 1:
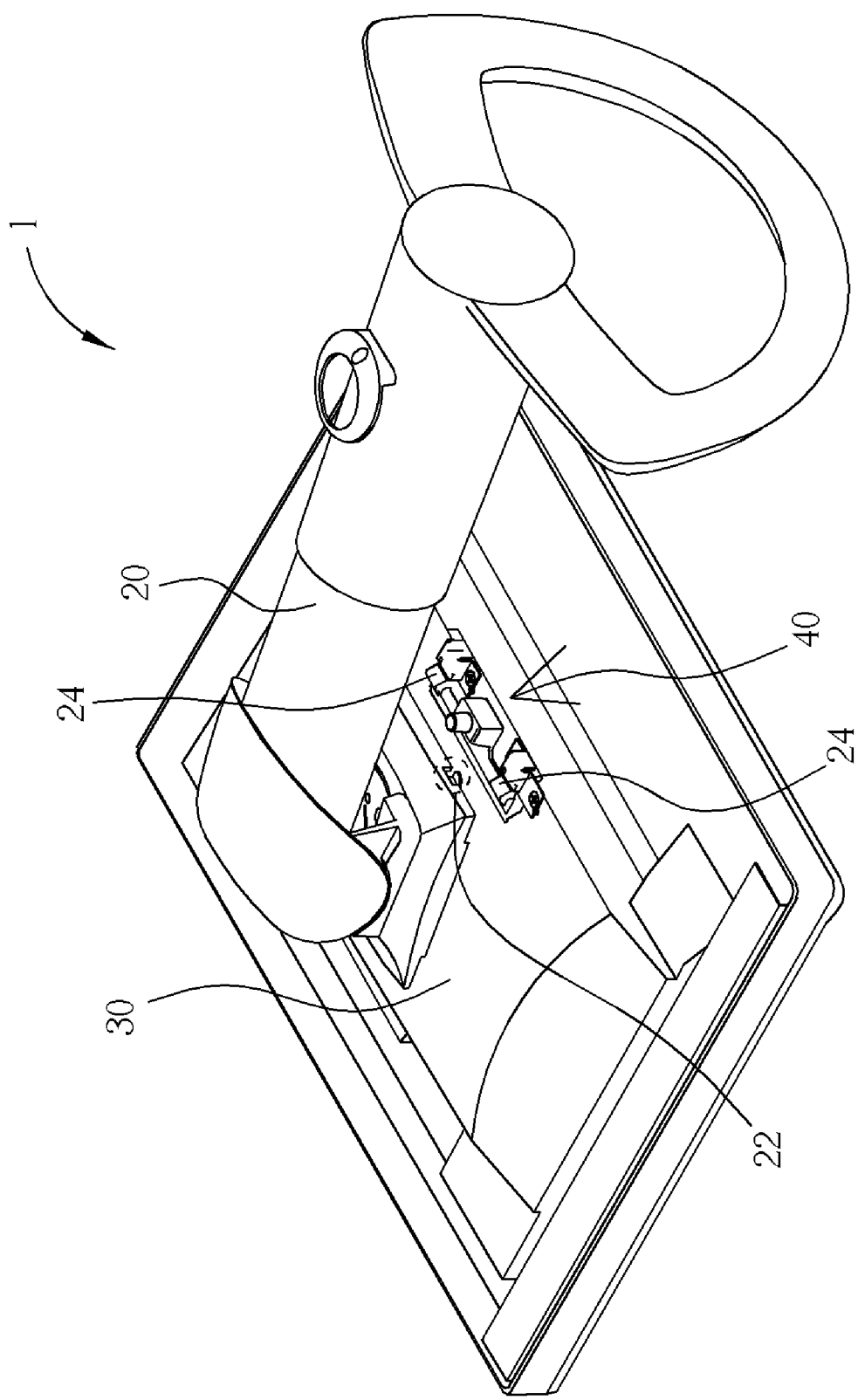
FIG. 1 is a diagram of a display in the prior art.
Figure 2:
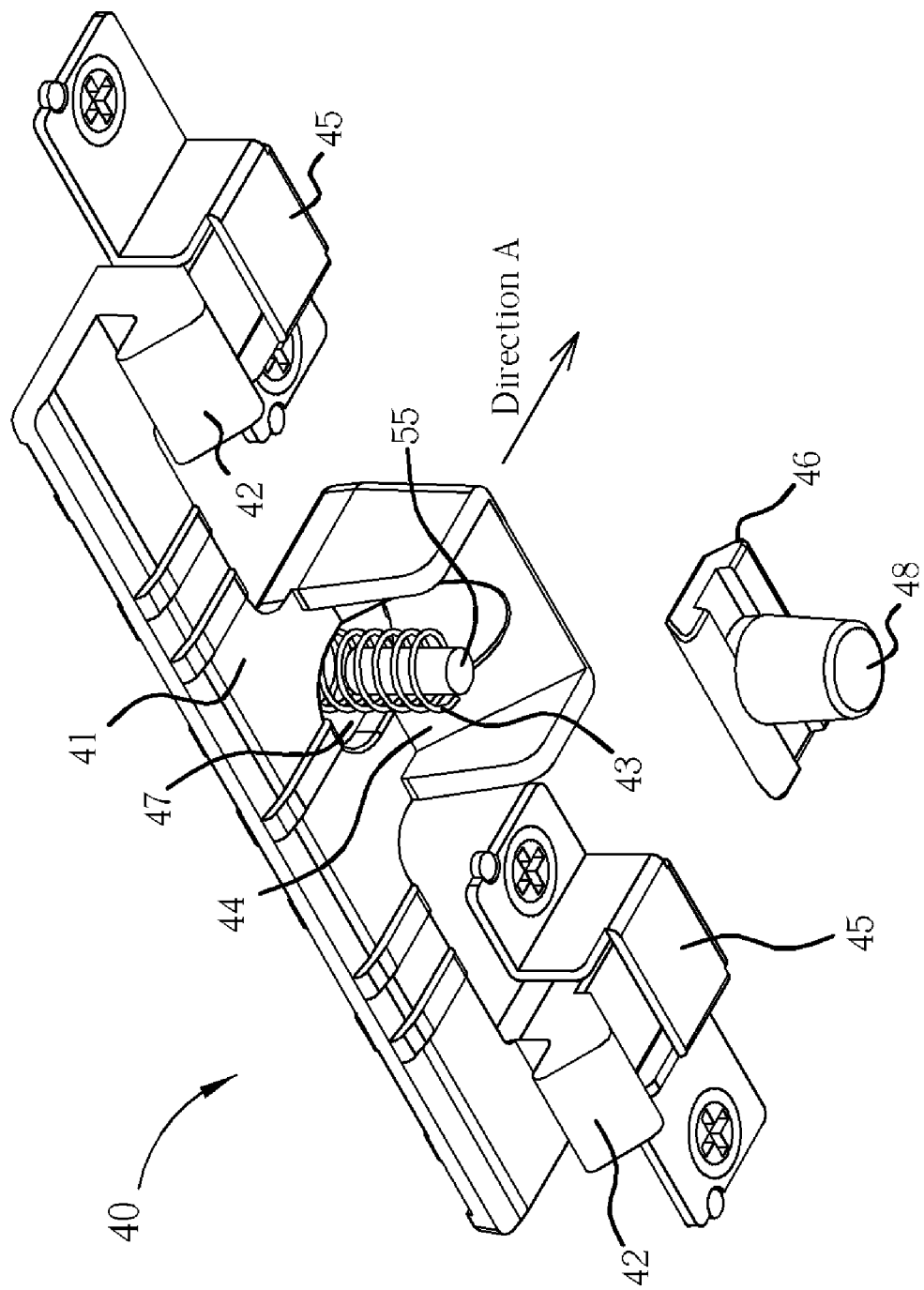
FIG. 2 is an expanded diagram of the press switch shown in FIG. 1.
Figure 3:
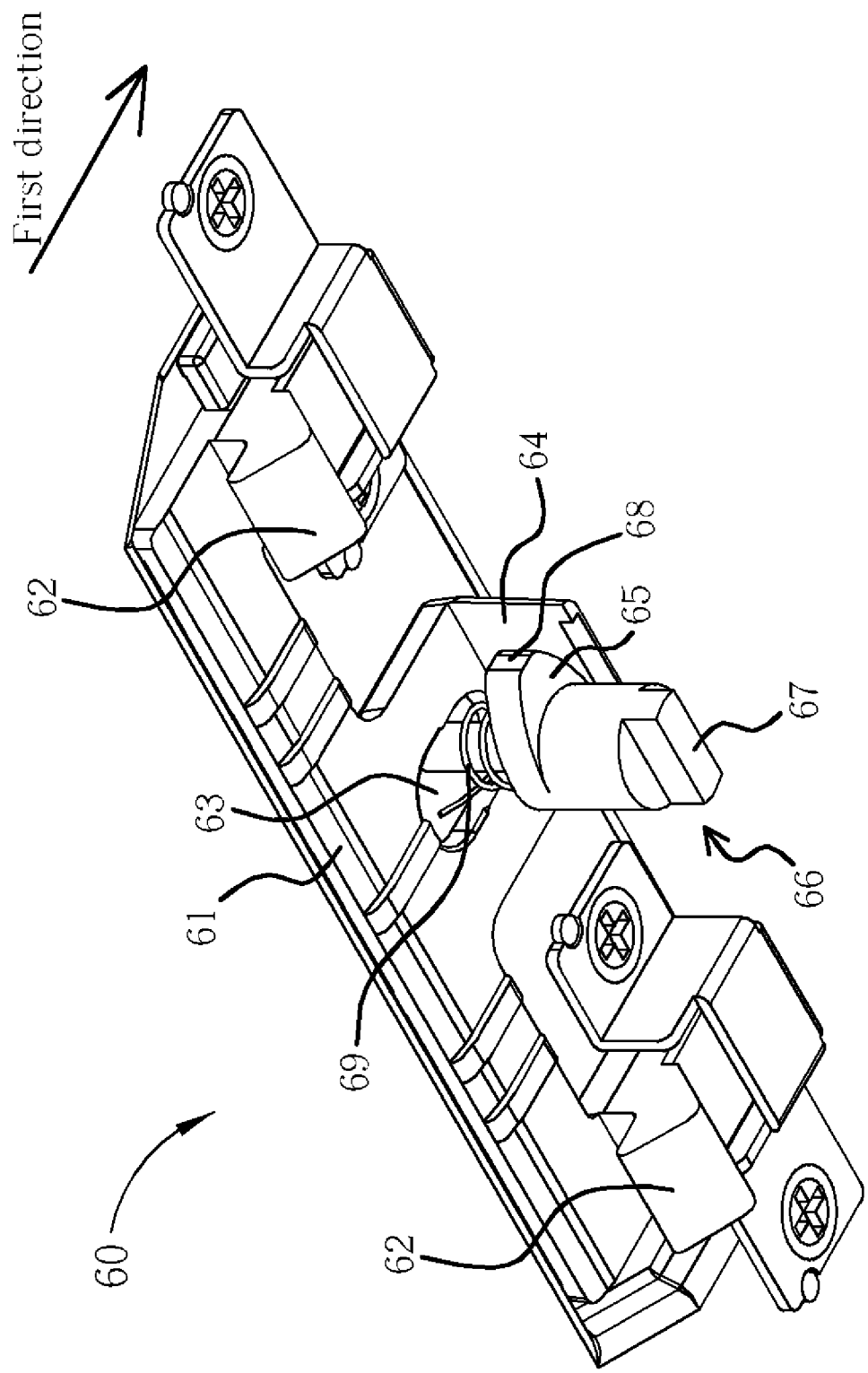
FIG. 3 is a diagram of the locking mechanism according to a preferred embodiment of the present invention.

Please refer to FIG. 3, which is a diagram of the locking mechanism 60 according to a preferred embodiment of the present invention. The locking mechanism 60 includes a base 61, a plate 64, a pivot 66, and two second locking members 62. The base 61 also includes a hole 63, which is extends along a first direction shown in FIG. 3. The plate 64 is connected to the base 61 and located near the hole 63. The plate 64 is disposed vertically with the base 61. The pivot 66 is inserted through the hole 63, and is located near the plate 64. The pivot 66 has a raised edge 68. A cam 65 is monolithically disposed on the pivot 66, where the raised edge 68 is located on the cam 65. The plate 64, the base 61, and both the second locking members 62 are preferably disposed monolithically. Both the second locking members 62 are implemented with male components such as clasps.

Figure 4:
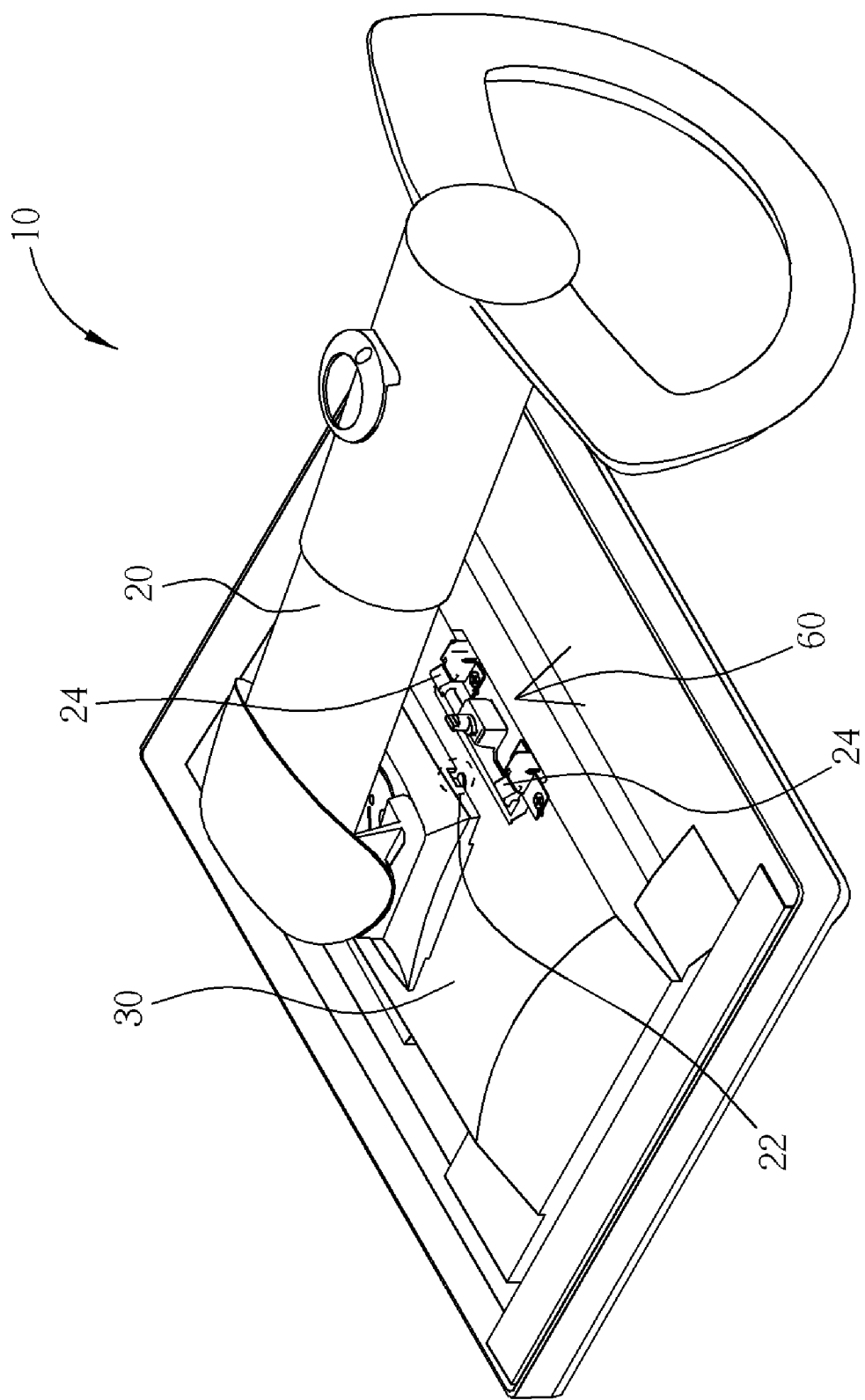
FIG. 4 is a diagram of a display according to a preferred embodiment of the present invention.

Please refer to FIG. 4, which is a diagram of a display 10 according to a preferred embodiment of the present invention. A primary difference between the displays 1 and 10 lies in the locking mechanism 60 shown in FIG. 3 for replacing the press switch 40 in the prior art.

As shown in FIG. 3 and FIG. 4, both the second locking members 62 are connected to the base 61 for selectively connected to the both the first locking members 22 on the support base 20. The pivot 66 preferably has a knob 67 exposed through a rear housing, which is not illustrated for brevity, of the display 10, where the knob 67 is utilized for enabling a user to rotate the pivot 66. When the user rotates the knob 67, the raised edge 68 on the pivot 66 pushes the plate 64 towards the first direction shown in FIG. 3. At this time, the base 61 and both the second locking members 62 are moved towards the first direction as well so that both the second locking members 62 are detached from both the first locking members 22 for detaching the support base 20 from the main frame 30. The locking mechanism 60 preferably includes a twist spring 69, both terminals of which are respectively connected to the pivot 66 and the main frame 30. When both the first locking members 22 are detached from both the second locking members 62, i.e., when the raised edge 68 touches the plate 64, the user may merely release the knob 67 so that the pivot 66 is rotated by the elastic force of the twist spring 69 for moving the locking mechanism 60 back to where it was shown in FIG. 3.

Note that in the locking mechanism 60 of the present invention, the number of the second locking members 62 is corresponding to the number of the first locking members 22, i.e., both the numbers are not limited to 2 as mentioned above. Moreover, the first locking member 22 and the second locking member 62 may be implemented with both a male component and a female component alternatively. For example, when the first locking member 22 is implemented with a male component, the second locking member 62 is implemented with a female component, and vice versa.

Compared with the display in the prior art, the display and its locking mechanism of the present invention may be utilized for solving the defect that larger room from the display in the prior art is required to be provided for containing the press switch.

Those skilled in the art will readily observe that numerous modifications and alterations of the device and method may be made while retaining the teachings of the invention.

What is claimed is:

1. A locking mechanism for selectively connecting a first locking member, the locking mechanism comprising:
a base moveable towards a first direction and having a hole;
a plate connected to the base and neighboring the hole;
a pivot rotatable with respect to the plate and rotating between a first angle and a second angle, wherein the pivot is inserted through the hole and neighboring the plate, the pivot having a raised edge; and
a second locking member connected to the base and for selectively engaging the first locking member;
wherein when the pivot is positioned in the first angle, the raised edge extends substantially parallel to the first direction to abut against the plate to make the plate move towards the first direction, so that the second locking member is detachable from the first locking member;
wherein when the pivot is positioned in the second angle, the raised edge extends substantially perpendicular to the first direction to be away from the plate to allow the second locking member to remain engaged with the first locking member.

2. The locking mechanism of claim 1 further comprising:
a cam disposed on the pivot;
wherein the raised edge is located on the cam.

3. The locking mechanism of claim 2 wherein the cam is monolithically formed on the pivot.

4. The locking mechanism of claim 1 wherein the plate is disposed vertically with the base.

5. The locking mechanism of claim 1 wherein the plate, the base, and the second locking member are monolithically formed.

6. The locking mechanism of claim 1 wherein the first locking member is a female component, and the second locking member is a male component.

7. A display comprising:
a support base having a first locking member;
a main frame having a locking mechanism for selectively connecting to the first locking member of the support base, wherein the locking mechanism comprises:
a base movable towards a first direction, the base having a hole;
a plate connected to the base and located near the hole;
a pivot rotatable disposed on the main frame and rotating between a first angle and a second angle, wherein the pivot is inserted through the hole and near the plate, and has a raised edge; and
a second locking member connected to the base for selectively engaging with the first locking member of the support base;
wherein when the pivot is positioned in the first angle, the raised edge extends substantially parallel to the first direction to abut against the plate to make the base move toward
the first direction, so that the second locking member is detachable from the first locking member;
wherein when the pivot is positioned in the second angle, the raised edge extends substantially perpendicular to the first direction to be away from the plate to allow the second locking member to remain engaged with the first locking member.

8. The display of claim 7 wherein the locking mechanism further comprises:
a cam disposed on the pivot;
wherein the raised edge is located on the cam.

9. The display of claim 8 wherein the cam is monolithically formed on the pivot.

10. The display of claim 7 wherein the plate is disposed vertically to the base.

11. The display of claim 7 wherein the plate, the base, and the second locking member are monolithically formed.

12. The display of claim 7 wherein the first locking member is a female component, and the second locking member is a male component.

13. The locking mechanism of claim 1 wherein the plate has a horizontal surface, and the raised edge slides on the horizontal surface when the pivot rotates between the first angle and the second angle.

14. The display of claim 7 wherein the plate has a horizontal surface, and the raised edge slides on the horizontal surface when the pivot rotates between the first angle and the second angle.

* * * * *